United States Patent
Maino et al.

[11] Patent Number: 6,029,930
[45] Date of Patent: Feb. 29, 2000

[54] METHOD OF MONITORING A TRANSMISSION ASSEMBLY OF A VEHICLE EQUIPPED WITH ACCELERATION SENSORS, IN PARTICULAR A HELICOPTER

[75] Inventors: Bruno Maino, Samarate; Alberto Bellazzi, Cameri, both of Italy

[73] Assignee: Finmeccanica S.p.A., Rome, Italy

[21] Appl. No.: 09/110,621

[22] Filed: Jul. 6, 1998

[30] Foreign Application Priority Data

Jul. 4, 1997 [IT] Italy .................................. TO97A0590

[51] Int. Cl.[7] ........................................................ B64C 11/34
[52] U.S. Cl. ........................... 244/17.13; 244/39; 244/60; 244/17.11; 180/337; 180/338
[58] Field of Search ............................. 244/17.13, 17.11, 244/60, 39; 180/377, 338

[56] References Cited

U.S. PATENT DOCUMENTS 3,699,806  10/1972  Weichbrodt ............................... 73/71.4
5,210,704   5/1993  Husseiny ............................. 364/551.01
5,365,787  11/1994  Hernandez ................................. 73/660
5,782,433   7/1998  Goi et al. .................................. 244/60

FOREIGN PATENT DOCUMENTS

WO96/05486  2/1996  WIPO .

Primary Examiner—J. Woodrow Eldred
Attorney, Agent, or Firm—Darby & Darby

[57] ABSTRACT

The monitoring method includes the steps of: acquiring a signal from an acceleration sensor; calculating a transform in the frequency domain of the signal to obtain a sequence of samples; acquiring a sample in the sequence of samples; calculating an actual amplitude value of the acquired sample; calculating a relative deviation between the actual amplitude value of the acquired sample and a reference amplitude value; and comparing the relative deviation with at least one predetermined threshold to immediately detect any irregularity in, and so prevent in-flight failure of, the helicopter transmission assembly.

11 Claims, 5 Drawing Sheets

METHOD OF MONITORING A TRANSMISSION ASSEMBLY OF A VEHICLE EQUIPPED WITH ACCELERATION SENSORS, IN PARTICULAR A HELICOPTER

BACKGROUND OF THE INVENTION

The present invention relates to a method of monitoring a transmission assembly of a vehicle equipped with acceleration sensors, in particular a helicopter.

As is known, helicopter transmission members must be monitored continuously to immediately detect any faults or incipient malfunction conditions, and so prevent failure during flight.

For this purpose, the transmission is equipped with acceleration sensors, the signals of which are processed to determine any faults on the transmission. The methods currently used, however, to process the fault detection sensor signals are not sensitive enough to ensure fault detection well in advance of catastrophic failure.

SUMMARY OF THE INVENTION

It is an object of the present invention to provide a monitoring method ensuring reliable, advance detection of any faults or malfunction conditions which might result in failure.

According to the present invention, there is provided a method of monitoring a transmission assembly of a vehicle equipped with acceleration sensors, in particular a helicopter, characterized by comprising the steps of:

a) acquiring a signal from an acceleration sensor;

b) calculating a transform in the frequency domain of said signal to obtain a sequence of samples;

c) acquiring a sample in said sequence of samples;

d) calculating an actual amplitude value of said acquired sample;

e) calculating a relative deviation between said actual amplitude value and a reference amplitude value; and f) comparing said relative deviation with at least a first predetermined threshold.

BRIEF DESCRIPTION OF THE DRAWINGS

A number of non-limiting embodiments of the invention will be described by way of example with reference to the accompanying drawings, in which.

DETAILED DESCRIPTION OF THE INVENTION

Figure 1:
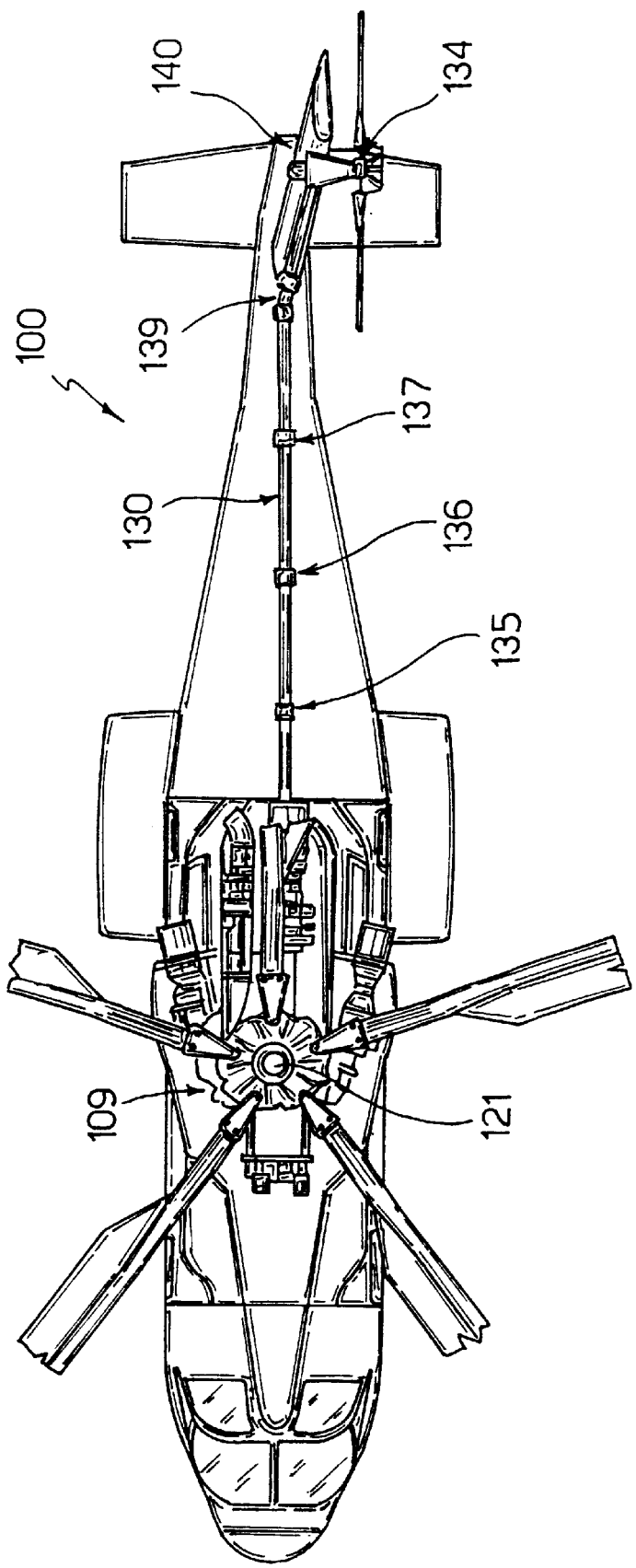
FIG. 1 shows a top plan view of a helicopter, in which the helicopter transmission is shown schematically.
Figure 2:
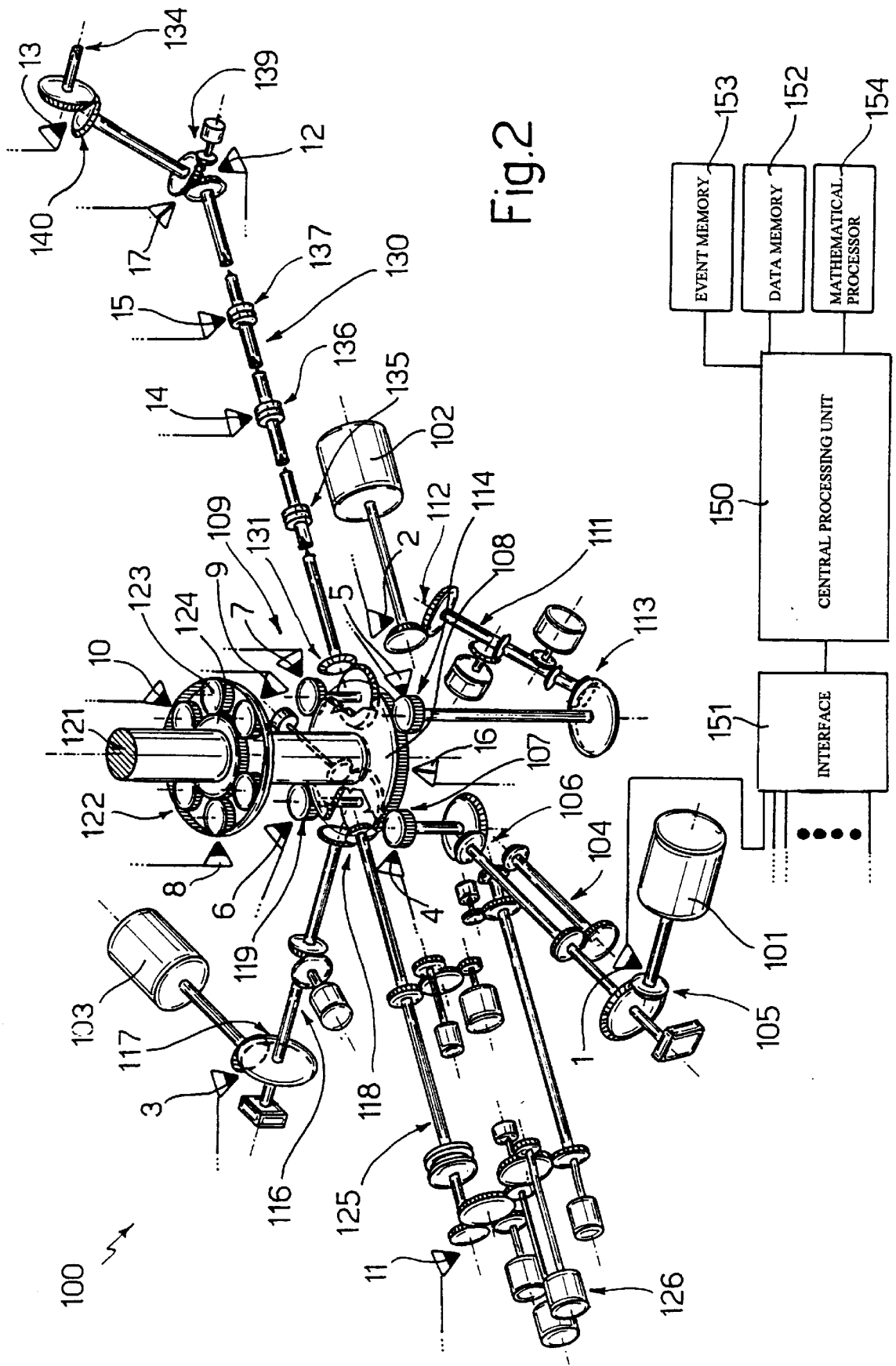
FIG. 2 shows a simplified diagram of the helicopter transmission and the location of various transmission member sensors.

FIGS. 1 and 2 show, schematically, the members of a helicopter 100 pertinent to the present invention. In particular, helicopter 100 comprises a first engine 101, a second engine 102, and a third engine 103; first engine 101 is connected, by means of a first transmission line 104 comprising a first, second and third reducer 105–107, to an input gear 108 of a main gear assembly 109; second engine 102 is connected to input gear 108 by means of a second transmission line 111 comprising a fourth, fifth and sixth reducer 112–114; and third engine 103 is connected to input gear 108 by means of a third transmission line 116 comprising a seventh, eighth and ninth reducer 117–119.

Input gear 108 is connected to a rotor 121 of helicopter 100 by means of an epicyclic reducer 122 forming part of main gear assembly 109 and comprising six planet gears 123 and a sun gear 124; and input gear 108 is also connected—by means of a fourth transmission line 125 also connected to first transmission line 104—to an accessory box indicated schematically by 126, and to a fifth transmission line 130 connected to a tail rotor 134 and comprising a power take-off gear 131, intermediate joints 135–137, an intermediate gearbox 139, and a tail gearbox 140.

FIG. 2 shows fifteen acceleration sensors 1–15 an two azimuth sensors 16, 17 fitted close to the reduction stages as indicated in Table I below.

TABLE I

| Sensor | Pos. | Sensor | Pos. | Sensor | Pos. |
|---|---|---|---|---|---|
| 1 | 105 | 7 | 131 | 13 | 140 |
| 2 | 112 | 8 | 122 (front) | 14 | 136 |
| 3 | 117 | 9 | 122 (right) | 15 | 137 |
| 4 | 107 | 10 | 122 (left) | 16 | 108 |
| 5 | 114 | 11 | 126 | 17 | 139 |
| 6 | 119 | 12 | 139 | | |

Helicopter 100 also comprises a data processing unit 150 connected to sensors 1–17 by an interface unit 151 for sampling and digitizing the sensor signals, and to a data memory 152, an event memory 153, and a mathematical processor 154.

The monitoring method described below provides for detecting problems arising and developing rapidly in flight, and may be used to advantage for detecting problems arising on the external and internal shafts on the basis of signals supplied by acceleration sensors 1–7 and 12–15.

The monitoring method provides for processing a signal s(t), supplied by whichever of acceleration sensors 1–7 or 12–15 is considered in each case, using a signal s1(t) supplied by the azimuth sensor on a shaft connected to the reducer monitored by the sensor in question (azimuth sensor 16 for acceleration sensors 1–7, and azimuth sensor 17 for acceleration sensors 12–15). Signal s(t) is a vibratory signal (related to the rotation frequency of the shaft associated with the sensor in question) and is affected by random noise as well as by noise related to other nearby rotary members.

Figure 3:
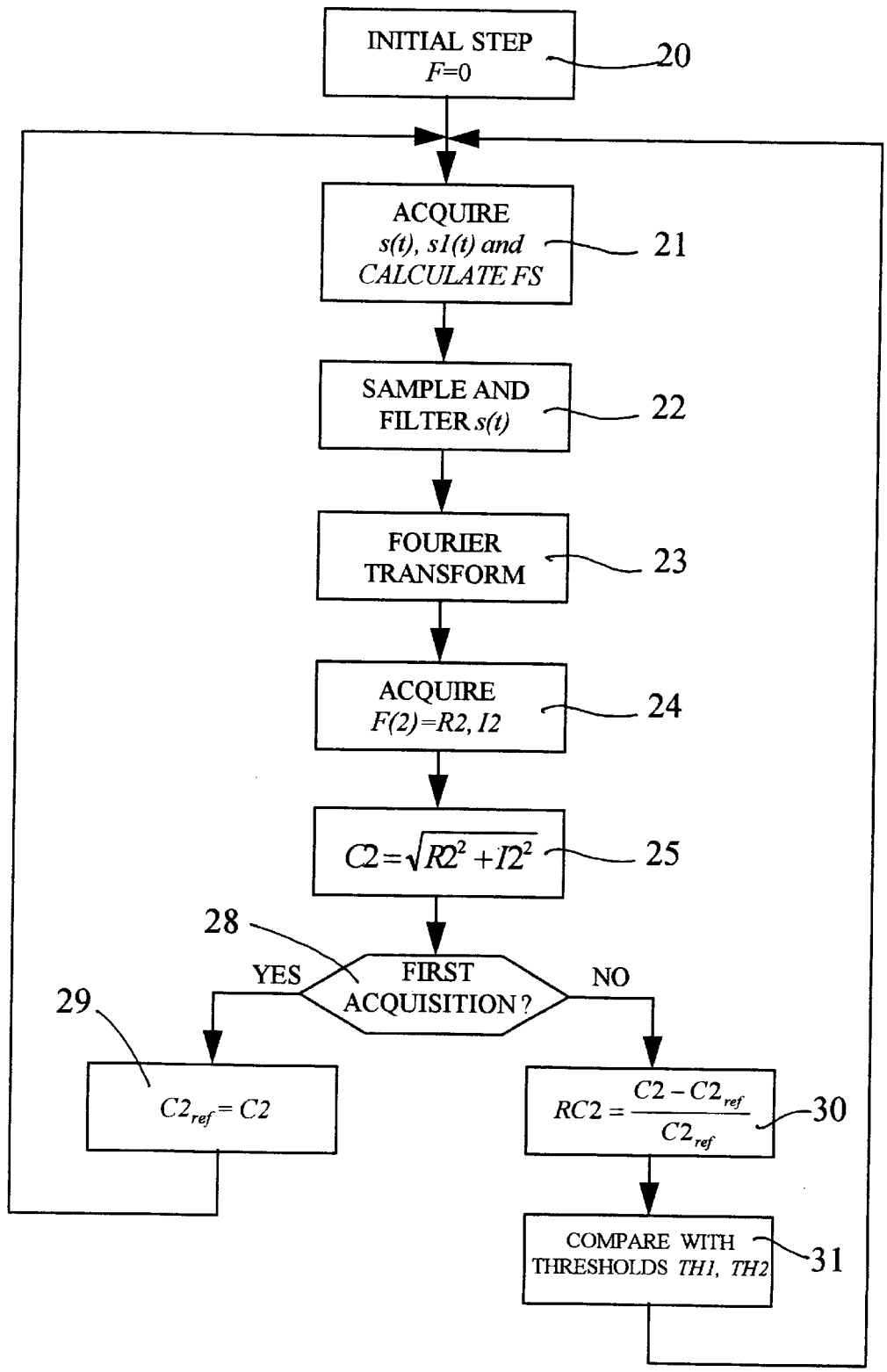
FIGS. 3–5 show flow charts of steps in the method according to the invention.

More specifically, and with reference to FIG. 3, the method comprises an initial step, in which a variable F (explained later on with reference to FIG. 5) is set to a first predetermined value, e.g. 0 (block 20).

Signal s(t) and signal s1(t) are then acquired (block 21), and a sampling frequency FS is calculated by multiplying the frequency of azimuth sensor signal s1(t) by a memorized coefficient KT equal to the ratio between two prime whole numbers, and in particular correlated to the transmission ratio between the azimuth sensor shaft and the shaft monitored by the sensor in question, so that the resulting sampling frequency FS is correlated to the azimuth sensor frequency, and is such as to supply exactly NJ points (where NJ is a power of 2) of signal s(t) for each revolution of the monitored shaft.

Signal s(t) is then sampled and filtered by interface unit 151 to remove the random noise and nonsynchronous periodic components (block 22) and obtain a filtered signal $T_{1m}(i)$ defined by a number of samples. Signal s(t) is preferably sampled and filtered using signal s1(t) and the sequence of steps shown in FIG. 4 and described in detail later on.

The Fourier transform F(k) of signal $T_{1m}(i)$ is then calculated (block 23), preferably using mathematical processor 154; the second spectral component F(2) of the transformed signal, comprising a real part R2 and an imaginary part I2, is acquired (block 24); and the amplitude (energy) C2 of the vibration is calculated (block 25) according to the equation:

$$C2 = \sqrt{R2^2 + I2^2} \quad (1)$$

If the above steps (blocks 21–25) are performed for the first time (YES output of block 28), value C2 calculated using equation (1) is memorized in data memory 152 to define a reference value $C2_{ref}$ (block 29) for use in subsequent iterations in the course of the same flight. The reference value is therefore calculated only once at the start of each flight, and may vary from one flight to another. Block 29 then goes back to block 21.

Conversely, if at least one acquisition has already been performed (NO output of block 28), a relative deviation parameter RC2 is calculated (block 30) according to the equation:

$$RC2 = \frac{C2 - C2_{ref}}{C2_{ref}}$$

where $C2_{ref}$ is the reference value defined above.

Figure 5:
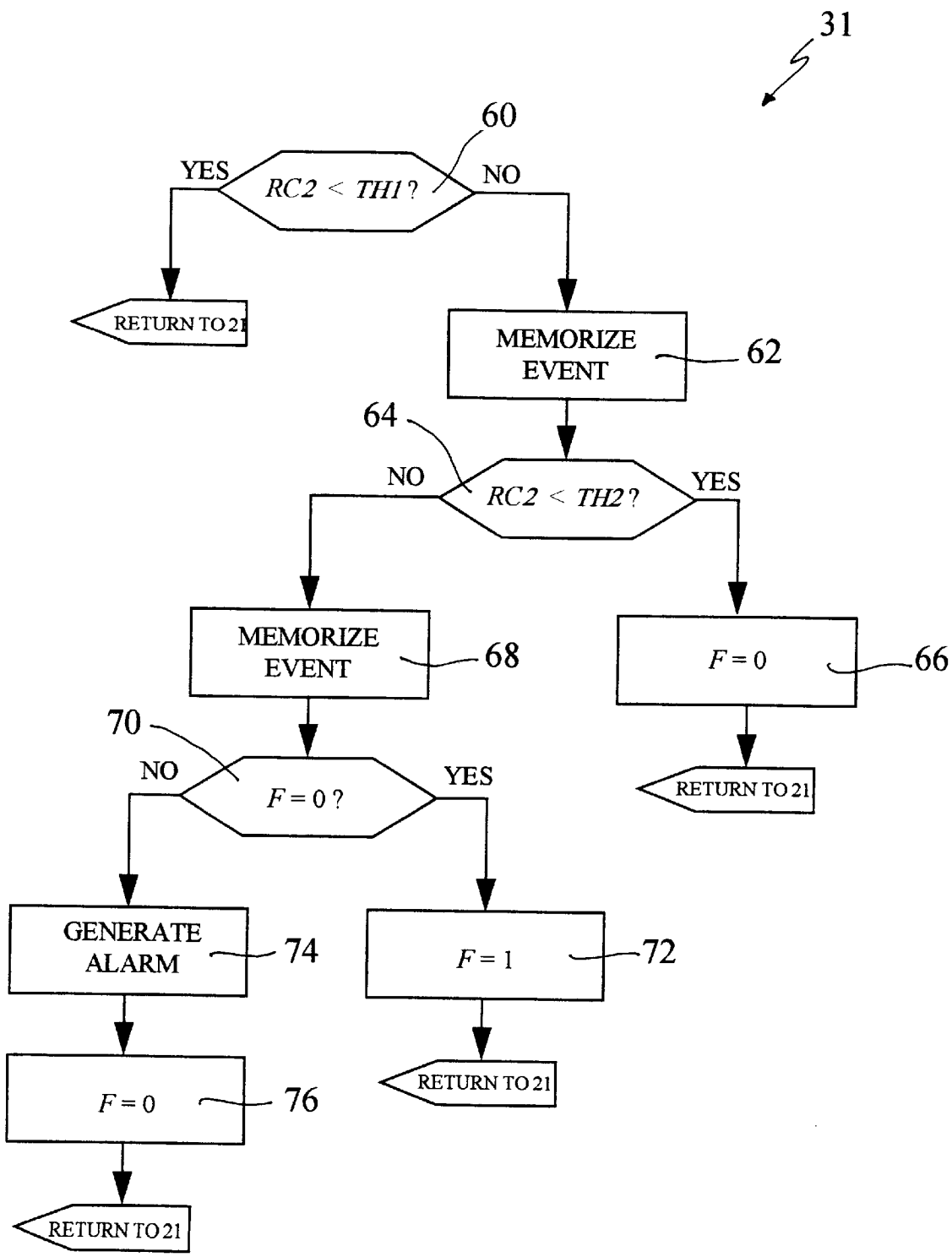

Central processing unit 150 then compares RC2 with two threshold values TH1, TH2 (where TH1<TH2) to generate, if necessary, alarm signals (block 31) according to the procedure described in detail later on with reference to FIG. 5, and block 31 then goes back to block 21 to continue monitoring with the next portion of signal s(t).

Figure 4:
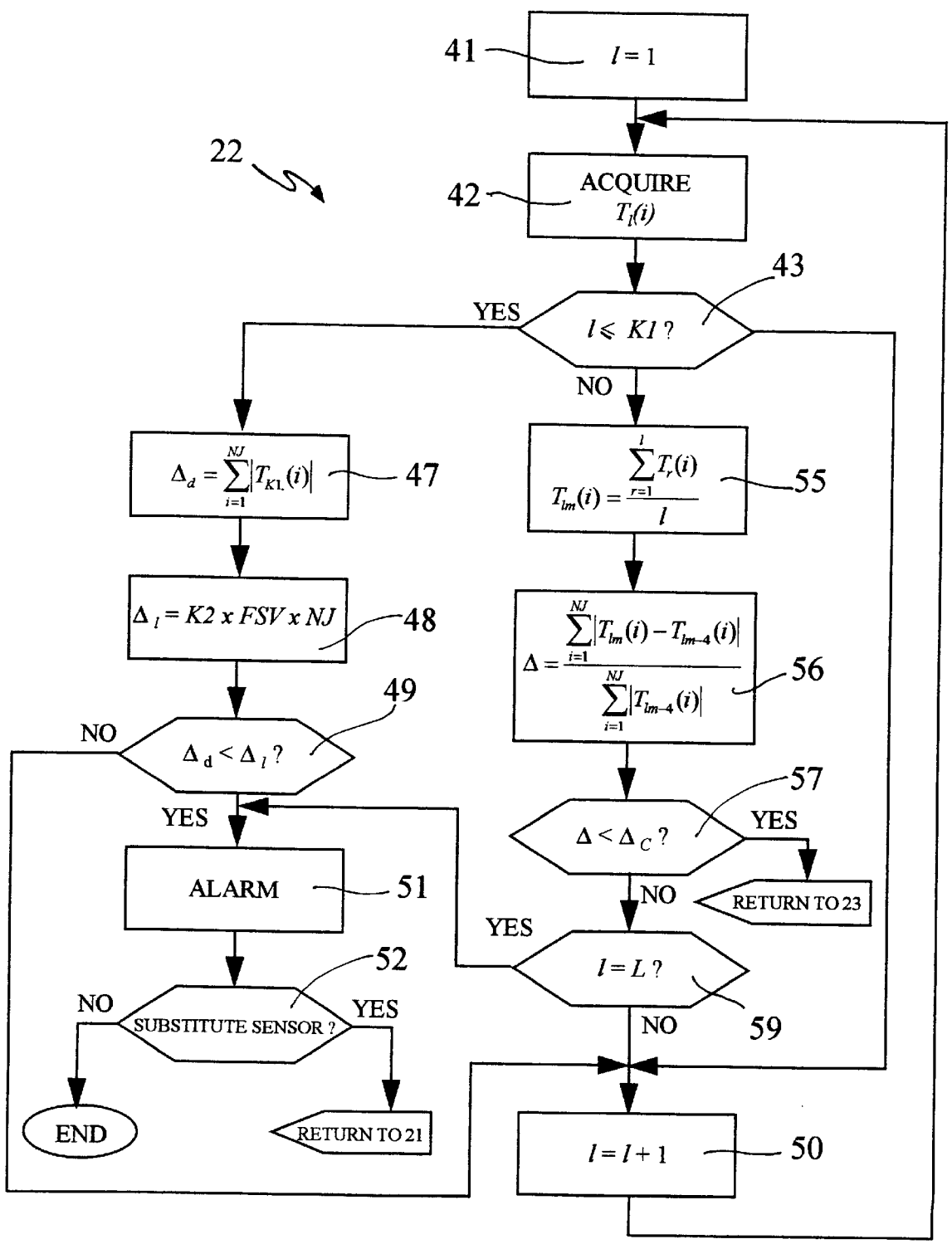

Sampling and filtering in block 22 are conveniently performed using the method described below with reference to FIG. 4.

To begin with, a revolution counter 1 is set to 1 (block 41); signal s(t) is sampled at frequency FS to obtain NJ points or samples $T_1$ (i) representing a synchronous vibratory time series relative to the sensor in question, to the respective shaft, and to each 1-th revolution (block 42); the value of counter 1, in particular whether it is less than or equal to a predetermined value K1, is determined (block 43); and, if counter 1 is less than or equal to K1 (performance of fewer than K1 iterations corresponding to the revolutions of the monitored shaft—YES output of block 43), the availability of the signal is determined by calculating (block 47) the sum $\Delta_d$ of the samples acquired at the 1-th revolution, according to the equation:

$$\Delta_d = \sum_{i=1}^{NJ} |T_{Kl}(i)|$$

A limit value $\Delta_1$ is then calculated (block 48) according to the equation:

$$\Delta_1 = K2 \times FSV \times NJ$$

where FSV is the bottom-scale value, and K2 a predetermined constant much lower than 1; and a check is made (block 49) to determine whether the calculated sum $\Delta_d$ is less than the limit value $\Delta_1$. In the event of a negative response (NO output of block 49), the signal is considered to exist, counter 1 is increased (block 50), and block 50 goes back to block 42 to acquire further NJ points relative to the next revolution. Conversely (YES output of block 49), the signal is considered nonexistent and an alarm signal is generated (block 51); a check is made (block 52) to determine the presence of a substitute sensor (e.g. sensor 6 for sensors 4 and 5l ); in the event of a positive response (YES output of block 52), block 52 goes back to block 21 in FIG. 3 to repeat the procedure on the substitute sensor; and, in the absence of a substitute sensor, or if convergence is not reached even with the substitute sensor (NO output of block 52), the procedure is interrupted.

Conversely, if counter 1 is greater than K1 (performance of more than K1 iterations corresponding to the revolutions of the monitored shaft—NO output of block 43), block 43 goes on to a block 55, which calculates the average contiguous synchronous time series $T_{1m}(i)$ defining the filtered signal calculated in block 22, according to the equation:

$$T_{lm}(i) = \frac{\sum_{r=1}^{l} T_r(i)}{l} \quad i = 1 \ldots NJ$$

i.e. the mean value of each sample $T_1$ (i) over the 1 revolutions considered is calculated.

Convergence of the averaging process is then determined by calculating a convergence value $\Delta$ given by the sum, over all the samples, of the absolute value of the difference between the actual mean value of each sample and the mean value calculated in a previous revolution (at distance 4) divided by the sum of the mean samples in the previous revolution considered (at distance 4), according to the equation:

$$\Delta = \frac{\sum_{i=1}^{NJ} |T_{lm}(i) - T_{lm-4}(i)|}{\sum_{i=1}^{NJ} |T_{lm-4}(i)|}$$

where $T_{1m}(i)$ represents the i-th sample of the 1-th iteration, and $T_{1m-4}$ (i) represents the i-th sample of the 1-4-th iteration (block 56).

A check is then made to determine whether the calculated convergence value $\Delta$ is no greater than a predetermined permissible minimum convergence value $\Delta_c$, (block 57). In the event of a positive response (YES output), the convergence process is interrupted, and block 57 goes back to the main program (block 23 in FIG. 3). Conversely, a check is made to determine whether the averaging process has already been performed a predetermined maximum number of times L (block 59). If the iteration (revolution) counter 1 is less than L (NO output), the counter is increased (block 50) and the operations described above are repeated. Conversely (YES output), the procedure for generating an alarm signal and possibly repeating the procedure with a substitute sensor, as described with reference to blocks 51–52, is repeated.

The threshold comparison and alarm generating step in block 31 of FIG. 3 is conveniently performed as described below with reference to FIG. 5.

To begin with, RC2 is compared with first threshold TH1 (block 60); if RC2<TH1 (YES output), block 60 goes back to block 21 in FIG. 3 to continue monitoring with the next group of samples; conversely, if threshold TH1 has been exceeded (NO output of block 60), the event is memorized in event memory 153 (block 62) and RC2 is compared with second threshold TH2 (block 64). If RC2<TH2 (YES output of block 64), variable F (initialized in block 20 of FIG. 3 to memorize whether threshold TH2 has already been exceeded) is set to (or confirmed at) the first predetermined value, 0 in the example shown (block 66), and block 66 goes back to block 21 of FIG. 3 to continue monitoring with the next group of samples. Conversely (NO output of block 64), the event is memorized in event memory 153 (block 68) and the value of variable F is determined (block 70). In particular, if variable F is at the first predetermined value (YES output), F is set to a second predetermined value, e.g. 1, (block 72), and block 72 goes back to block 21 of FIG. 3 to continue monitoring with the next group of samples. Conversely, if variable F is at the second predetermined value, i.e. threshold TH2 has already been exceeded (NO output of block 70), a pilot alarm signal is generated (block 74), variable F is again set to the first predetermined value (block 76), and block 76 goes back to block 21 of FIG. 3 to continue monitoring with the next samples.

The advantages of the method described are as follows. In particular, the method provides for indicating conditions of unbalance resulting in severe vibration, which in turn severely stresses the shafts and may sooner or later result in failure of the monitored shaft. Moreover, the method provides for distinguishing useful monitoring components from random noise and noise generated by other nearby moving members, and is therefore especially reliable for indicating problems arising and evolving rapidly in flight.

Clearly, changes may be made to the method as described and illustrated herein without, however, departing from the scope of the present invention. In particular, the filtering and averaging procedure and the alarm generating procedure may differ from those described.

We claim:

1. A method of monitoring a transmission assembly of a vehicle equipped with acceleration sensors, comprising the steps of:

a) acquiring a signal from an acceleration sensor mounted on the transmission assembly for detecting the acceleration fo a moving member of the transmission assembly;

b) calculating a transform in the frequency domain of said signal to obtain a sequence of samples;

c) acquiring a sample in said sequence of samples;

d) calculating an actual amplitude value of said acquired sample;

e) calculating a relative deviation between said actual amplitude value and a reference amplitude value;

f) comparing said relative deviation with at least a first predetermined threshold; and g) generating an alarm signal if said relative deviation exceeds said at least a first predetermined threshold.

2. A method as claimed in claim 1, characterized in that said transform is a Fourier transform.

3. A method as claimed in claim 1, characterized in that said step of acquiring a sample comprises acquiring the second sample in said sequence of samples.

4. A method as claimed in claim 1, characterized in that said step of calculating a relative deviation comprises calculating a quantity RC2 according to the equation:

$$RC2 = \frac{C2 - C2_{ref}}{C2_{ref}}$$

where C2 is said actual amplitude value, and $C2_{ref}$ is said reference amplitude value.

5. A method as claimed in claim 4, characterized by repeating said steps from a) to f) for a number of iterations; and in that said reference amplitude value equals the actual amplitude value calculated in a first iteration.

6. A method as claimed in claim 1, characterized in that said step of calculating a transform is preceded by a step of sampling and filtering said signal.

7. A method as claimed in claim 6, characterized in that said step of sampling and filtering comprises the steps of:

acquiring a number of synchronous samples $T_1(i)$ for each revolution of a shaft associated with said acceleration sensor; and calculating an average time series $T_{1m}(i)$ according to the equation:

$$T_{1m}(i) = \frac{\sum_{r=1}^{l} T_r(i)}{l} \quad i = 1 \ldots NJ$$

where $T_1(i)$ is said synchronous samples, and l is a counter for counting the number of revolutions of said shaft.

8. A method as claimed in claim 7, characterized in that said step of calculating an average time series is preceded by a step of determining the presence of significant signal values.

9. A method as claimed in claim 7, characterized in that said step of calculating an average time series is followed by a step of determining convergence of said average time series.

10. A method as claimed in claim 1, characterized in that said step of comparing said relative deviation also comprises the step of comparing said relative deviation with a second threshold.

11. A method as claimed in claim 10, characterized in that said step of comparing said relative deviation comprises the steps of memorizing first-threshold crossover information when said first threshold is exceeded, and generating an alarm signal when said second threshold is exceeded in two successive iterations.

\* \* \* \* \*